(12) United States Patent
Ramamurthy et al.

(10) Patent No.: US 11,566,839 B2
(45) Date of Patent: Jan. 31, 2023

(54) CONTROLLED LIQUEFACTION AND ENERGY MANAGEMENT

(71) Applicant: Energy Internet Corporation, Saratoga, CA (US)

(72) Inventors: Shankar Ramamurthy, Saratoga, CA (US); Shankar Nataraj, Allentown, PA (US)

(73) Assignee: Energy Internet Corporation, Saratoga, CA (US)

( * ) Notice: Subject to any disclaimer, the term of this patent is extended or adjusted under 35 U.S.C. 154(b) by 164 days.

(21) Appl. No.: 17/184,644

(22) Filed: Feb. 25, 2021

(65) Prior Publication Data

US 2021/0180860 A1 Jun. 17, 2021

Related U.S. Application Data

(63) Continuation-in-part of application No. 16/857,854, filed on Apr. 24, 2020, which is a continuation-in-part of application No. 16/747,843, filed on Jan. 21, 2020, which is a continuation-in-part of application No. 16/378,243, filed on Apr. 8, 2019, now Pat. No.
(Continued)

(51) Int. Cl.
*F25J 1/00* (2006.01)
*F25J 5/00* (2006.01)

(52) U.S. Cl.
CPC .............. *F25J 1/0022* (2013.01); *F25J 1/008* (2013.01); *F25J 1/0072* (2013.01); *F25J 1/0075* (2013.01); *F25J 1/0095* (2013.01); *F25J 5/005* (2013.01); *F25J 2215/00* (2013.01)

(58) Field of Classification Search
CPC ........ F25J 1/0022; F25J 1/0072; F25J 1/0075; F25J 1/008; F25J 1/0095; F25J 5/005; F25J 2215/00; F25J 1/0012; F25J 1/0251; F25J 1/0252; G06Q 10/06315; G06Q 50/06; H02J 15/003
See application file for complete search history.

(56) References Cited

U.S. PATENT DOCUMENTS 5,934,076 A   8/1999 Coney
9,540,957 B2  1/2017 Shinnar et al.
(Continued)

FOREIGN PATENT DOCUMENTS

WO   WO2015123784 A1   8/2015

*Primary Examiner* — Ziaul Karim
(74) *Attorney, Agent, or Firm* — Adams Intellex, PLC

(57) ABSTRACT

Disclosed techniques include controlled liquefaction and energy management. A gas within a first pressure containment vessel is pressurized using a column of liquid. The gas that is being pressurized is cooled using a liquid spray, wherein the liquid spray is introduced into the first pressure containment vessel in a region occupied by the gas. The liquid spray keeps the pressurizing to be isothermal. The gas that was pressurized is metered into a second pressure containment vessel, wherein the metering enables liquefaction of the gas. The gas that was pressurized is stored in a gas capacitor prior to the metering. The gas that was liquefied in the second pressure containment vessel is pushed into a holding tank, wherein the holding tank stores a liquefied state of the gas, and wherein the pushing is accomplished by the pressure of the gas that was metered into the second pressure containment vessel.

23 Claims, 5 Drawing Sheets

Related U.S. Application Data 10,947,899, which is a continuation-in-part of application No. 16/118,886, filed on Aug. 31, 2018, now Pat. No. 10,725,441.

(60) Provisional application No. 63/110,417, filed on Nov. 6, 2020, provisional application No. 63/048,032, filed on Jul. 3, 2020, provisional application No. 63/047,188, filed on Jul. 1, 2020, provisional application No. 62/981,629, filed on Feb. 26, 2020, provisional application No. 62/916,449, filed on Oct. 17, 2019, provisional application No. 62/838,992, filed on Apr. 26, 2019, provisional application No. 62/795,133, filed on Jan. 22, 2019, provisional application No. 62/795,140, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018, provisional application No. 62/552,747, filed on Aug. 31, 2017.

(56) References Cited

U.S. PATENT DOCUMENTS

| | | | |
|---|---|---|---|
| 9,562,183 B2 | 2/2017 | Hidalgo et al. | |
| 9,568,235 B2 | 2/2017 | Dobbs | |
| 9,631,846 B2 | 4/2017 | Chen et al. | |
| 9,651,030 B2 | 5/2017 | Kim et al. | |
| 9,664,140 B2 | 5/2017 | Kalika | |
| 10,563,621 B2 | 2/2020 | Pages | |
| 2003/0036806 A1 | 2/2003 | Schienbein et al. | |
| 2008/0046387 A1 | 2/2008 | Gopal et al. | |
| 2008/0071705 A1 | 3/2008 | Enis et al. | |
| 2008/0172279 A1 | 7/2008 | Enis et al. | |
| 2008/0202159 A1* | 8/2008 | Fountain | F25J 1/0085 62/612 |
| 2009/0200805 A1 | 8/2009 | Kim et al. | |
| 2009/0301089 A1* | 12/2009 | Bollinger | F01K 27/00 60/648 |
| 2009/0319090 A1 | 12/2009 | Dillon et al. | |
| 2010/0308765 A1 | 12/2010 | Moore et al. | |
| 2010/0312490 A1* | 12/2010 | Dooley | F22B 37/38 702/24 |
| 2012/0053737 A1 | 3/2012 | Valluri et al. | |
| 2013/0168961 A1 | 7/2013 | Stahlkopf et al. | |
| 2013/0336721 A1* | 12/2013 | McBride | F17C 1/007 405/55 |
| 2014/0039710 A1 | 2/2014 | Carter et al. | |
| 2014/0129042 A1 | 5/2014 | Miner | |
| 2014/0172182 A1 | 6/2014 | Subbotin et al. | |
| 2015/0033724 A1* | 2/2015 | Fong | F15B 15/02 60/407 |
| 2015/0143806 A1 | 5/2015 | Friesth | |
| 2016/0207703 A1 | 7/2016 | Elazari-Volcani | |
| 2016/0336928 A1 | 11/2016 | Kuznetsov | |
| 2017/0005515 A1* | 1/2017 | Sanders | H02J 3/322 |
| 2017/0009428 A1* | 1/2017 | Hijikata | E02F 9/2292 |
| 2017/0038157 A1 | 2/2017 | O'Donnell et al. | |
| 2017/0044414 A1 | 2/2017 | Sutterlin et al. | |
| 2017/0067667 A1 | 3/2017 | Choi | |
| 2017/0082060 A1 | 3/2017 | Kalika | |
| 2017/0082123 A1 | 3/2017 | Momen et al. | |
| 2017/0082380 A1 | 3/2017 | Gauche et al. | |
| 2017/0159495 A1 | 6/2017 | Laughlin et al. | |
| 2019/0003425 A1 | 1/2019 | Pages | |
| 2019/0056174 A1 | 2/2019 | Ragot et al. | |

\* cited by examiner

CONTROLLED LIQUEFACTION AND ENERGY MANAGEMENT

RELATED APPLICATIONS

This application claims the benefit of U.S. provisional patent applications "Controlled Liquefaction and Energy Management" Ser. No. 62/981,629, filed Feb. 26, 2020, "Energy Transfer Using High-Pressure Vessel" Ser. No. 63/047,188, filed Jul. 1, 2020, "Controlled Liquefaction Using Compatible Materials for Energy Management" Ser. No. 63/048,032, filed Jul. 3, 2020, and "Control of Software Defined Mechanical Machines Using Description Language" Ser. No. 63/110,417, filed Nov. 6, 2020.

This application is also a continuation-in-part of U.S. patent application "Energy Transfer Through Fluid Flows" Ser. No. 16/857,854, filed Apr. 24, 2020, which claims the benefit of U.S. provisional patent applications "Energy Transfer Through Fluid Flows" Ser. No. 62/838,992, filed Apr. 26, 2019, "Desalination Using Pressure Vessels" Ser. No. 62/916,449, filed Oct. 17, 2019, and "Controlled Liquefaction and Energy Management" Ser. No. 62/981,629, filed Feb. 26, 2020.

The U.S. patent application "Energy Transfer Through Fluid Flows" Ser. No. 16/857,854, filed Apr. 24, 2020 is also a continuation-in-part of U.S. patent application "Energy Management Using a Converged Infrastructure" Ser. No. 16/747,843, filed Jan. 21, 2020, which claims the benefit of U.S. provisional patent applications "Energy Management Using a Converged Infrastructure" Ser. No. 62/795,140, filed Jan. 22, 2019, "Energy Management Using Electronic Flywheel" Ser. No. 62/795,133, filed Jan. 22, 2019, "Energy Transfer Through Fluid Flows" Ser. No. 62/838,992, filed Apr. 26, 2019, and "Desalination Using Pressure Vessels" Ser. No. 62/916,449, filed Oct. 17, 2019.

The U.S. patent application "Energy Management Using a Converged Infrastructure" Ser. No. 16/747,843, filed Jan. 21, 2020 is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to liquefaction control and more particularly to controlled liquefaction and energy management.

BACKGROUND

Energy demand largely has been driven by the growth of municipalities, counties, states, and countries. Some countries are actively engaged in reducing their energy demands and revamping their energy infrastructures, while others are constructing fossil fuel burning power plants, nuclear facilities, hydro dams, and other controversial or traditional energy generation sources. Increased energy demand is further propelled by the development of rural and previously underserved areas. The increased demand accompanies improved living standards, particularly in rural areas, requiring both the installation of electrical and communications infrastructures, and the expansion of transportation networks. Growing populations cause a further increase in energy demand as more people consume energy for cooking, bathing, cleaning, laundry, and entertaining. Energy is additionally consumed for illuminating, heating, and cooling houses or apartments, businesses, and government buildings. Expanded economic activities increase energy demand, including retail, public transportation, and manufacturing, among many others.

Many parties that consume energy, including government agencies, energy producers, and conservation minded consumers, strive to reduce their energy consumption. These parties are motivated to initiate, practice, and enforce energy conservation measures for environmental and economic reasons. Consumers can decrease their energy footprints by lowering the thermostat in winter or increasing the thermostat in summer; turning off lights when leaving a room; and purchasing energy-efficient appliances, electronic consumer products, and automobiles. Each of these simple tasks is a commonly used step toward reducing cost through energy conservation. Yet while these and other concerted conservation efforts are helpful, the demand for energy of all types continues to increase beyond the savings which are solely attributable to conservation. The growth of towns, cities, states, and countries increases the demand for energy of all kinds, resulting in what many analysts identify as an energy crisis. Thus, increasing energy demand has many dimensions. Increased demand for and overconsumption of energy has imposed strains on natural resources ranging from fossil fuels to renewables such as wood chips, resulting in fuel shortages and increased environmental destruction and pollution. In addition, environmental occurrences such as forest fires, cold snaps, and heat waves can further affect both the supply and the demand of energy.

Inefficiencies in energy distribution present a persistent hindrance to solving the energy crisis. The existing energy distribution infrastructure is at or over capacity, and is often unavailable to potential new energy sources including renewable energy, which remain largely unexplored or underdeveloped. There is strong and vociferous resistance by adjacent landowners and others to siting of mountain or offshore wind turbines, solar farms, or wood burning plants. Even when designs can be drafted and permits obtained to construct renewable energy producing facilities, the distribution of the energy is impeded by the poor distribution infrastructure. Landowners are reluctant to agree to high tension lines traversing their property, particularly when the power is destined for consumers "from away". Commissioning new energy generation facilities remains a seemingly insurmountable challenge. Energy loss and wastage also remain major impediments to efficient energy distribution. Aging appliances or manufacturing equipment, incandescent light bulbs, and poor building insulation and air sealing all waste energy when compared to their modern counterparts. Public officials at all levels, planners, and others are compelled to choose from among three broad energy solutions: to increase energy production, to reduce energy demand through energy conservation, or to implement a combination of both of these strategies.

SUMMARY

Energy can be produced by diverse and disparate generation sources. The difference between energy production and energy consumption typically increases or decreases over a given period of time. These differences can further depend on a timeframe such as day versus night, day of the week, manufacturing schedules, seasonal factors such as heating or cooling, and so on. The discrepancies between energy production and energy consumption can be substantial and at times acute. The discrepancies can be correlated to the time-dependent energy demands, changeable energy production capabilities such as the presence or absence of a renewable resource used to generate the energy, available capacity of commercial or grid power, the amount of standby or backup energy, and so on. To ameliorate the energy production/consumption asymmetry, energy that is in excess to demand at a given time can be stored for later use. The stored energy can be sourced when demand exceeds a given power level or supply capability. Energy can be collected and stored when a renewable resource is available, when the energy available exceeds the energy needed, or even when the cost of production of the energy is relatively inexpensive. The stored energy can be used to augment available energy or instead to provide the amount of energy that is needed during periods of increased or unmet energy need. The recovery of stored energy can be applied to low-level energy demand scenarios, such as the energy needs of a house or small farm operation, or to larger scale energy needs such as the energy needs for manufacturing, or even to the largest energy needs such as an energy distribution grid.

Disclosed techniques address controlled liquefaction and energy management. A gas within a first pressure containment vessel is pressurized using a column of liquid. The gas that is being pressurized is cooled using a liquid spray, wherein the liquid spray is introduced into the first pressure containment vessel in a region occupied by the gas. The gas that was pressurized is metered into a second pressure containment vessel, wherein the metering enables liquefaction of the gas. The gas that was liquefied in the second pressure containment vessel is pushed into a holding tank, wherein the holding tank stores a liquefied state of the gas, and wherein the pushing is accomplished by the pressure of the gas that was metered into the second pressure containment vessel.

A computer-implemented method for liquefaction control is disclosed comprising: pressurizing a gas within a first pressure containment vessel using a column of liquid; cooling the gas that is being pressurized using a liquid spray, wherein the liquid spray is introduced into the first pressure containment vessel in a region occupied by the gas; metering the gas that was pressurized into a second pressure containment vessel, wherein the metering enables liquefaction of the gas; and pushing the gas that was liquefied in the second pressure containment vessel into a holding tank, wherein the holding tank stores a liquefied state of the gas, and wherein the pushing is accomplished by the pressure of the gas that was metered into the second pressure containment vessel. In embodiments, the liquid spray keeps the pressurizing to be isothermal. The liquid spray can include the same substance as the column of liquid or can include a dissimilar substance from the gas which is being pressurized. The cooling function is accomplished using $NH_3$, $CH_4$, Liquefied Natural Gas, $CO_2$, air, or Freon™. The dissimilar substance can be removed after the cooling. Embodiments further include dehydrating the gas which is being pressurized after the cooling. The pressurizing, the cooling, the metering, and the pushing are controlled using a computing device.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
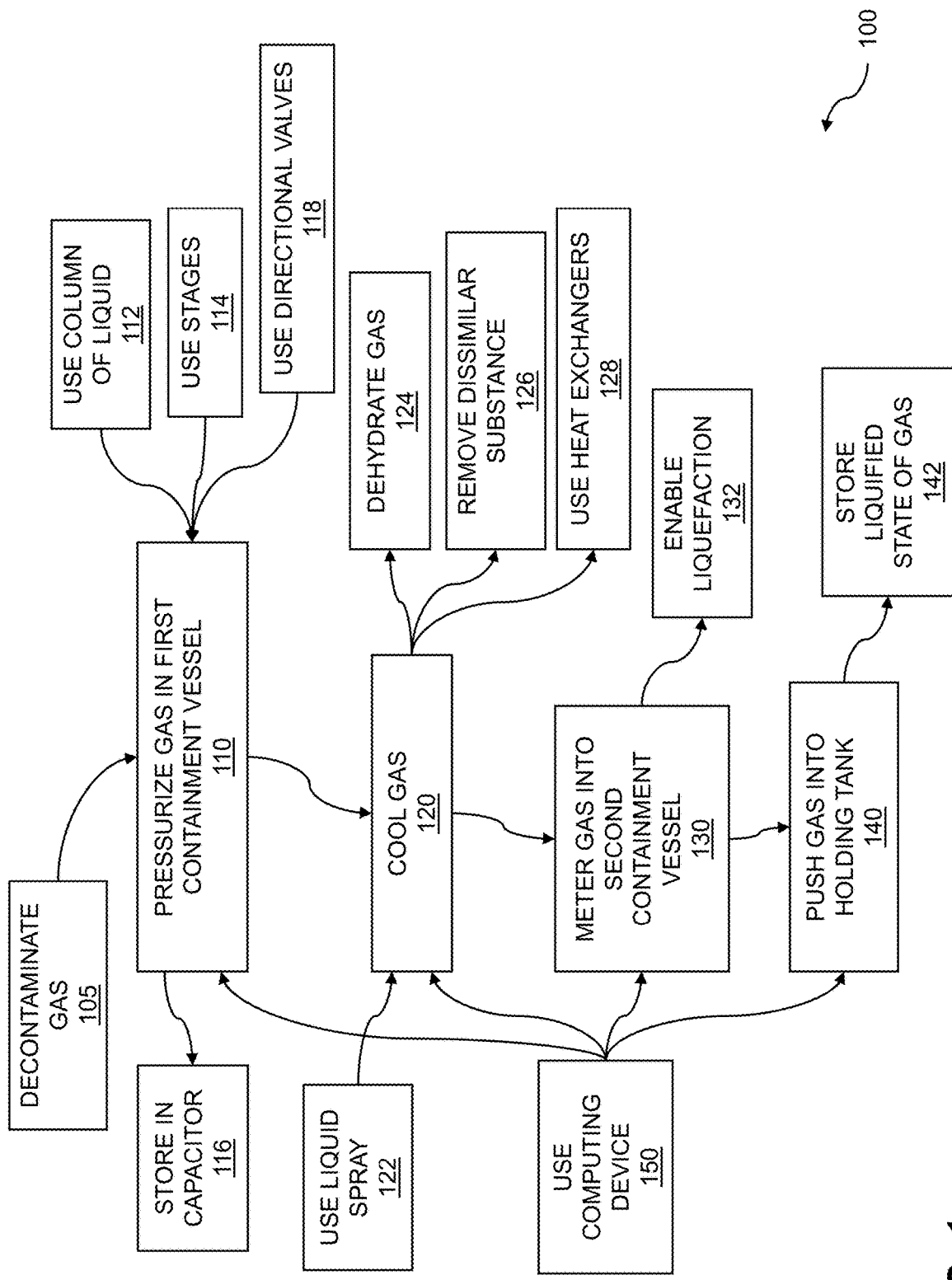
FIG. 1 is a flow diagram for controlled liquefaction and energy management.

This disclosure provides techniques for controlled liquefaction and energy management. The energy management is based on storing energy such as grid energy, renewable energy, and so on, using a liquefied gas. The liquefied gas can be stored within a holding tank, where the holding tank can include a cryogenic tank. The holding tank can be part of a large-scale energy storage subsystem which can store energy from one or more points of generation. The stored energy can be provided after a period of time to meet energy demands of otherwise unmet demands such as energy demands of dynamic loads. The energy that is stored using the liquefied gas can be received from diverse and disparate energy sources. Energy can be shaved or harvested and stored when the amount of energy available from the points of generation exceeds the energy demand at the time of energy generation. The energy can be stored for a period of time. The energy storage includes electrical energy storage using batteries or capacitors. The energy storage can include multiple pressurized storage elements such as compressed air storage elements. The energy storage includes the one or more liquefied gases within a holding tank. The storage of the energy and the recovery of the energy can include use of a water piston heat engine (WPHE). Managing the sourcing, storing, and transforming of energy, while minimizing energy losses, is a complex and highly challenging task. Energy management can be influenced by many factors including the weather, dynamic and often wildly varying energy demands, variable pricing schemes, and so on. Energy management can be further complicated by quickly changing customer energy demands, requirements of service level agreements (SLAs), etc. Despite the growing use of renewable energy resources such as solar, wind, wave action, tidal, geothermal, biogas, and the like, two significant challenges remain: the amount of energy produced by a given renewable energy source is highly variable, and the availability of the renewable energy source is inconsistent. As an example, wind energy is only available when wind is present, solar energy only when the sun is shining, wave action energy only when waves are present, and so on.

Energy with intermittent availability or excess energy can be stored or cached when the energy is being produced, and can be extracted at a later time when the stored energy is needed. A similar strategy can be used based on price, where energy is stored when production cost is low, then later extracted when the energy production cost is high. The stored energy can be used in combination with other energy sources such as grid power or microgrid (e.g., locally generated) power to meet energy demands at given times. Energy storage can be based a period of time, where the period of time can be a short-term basis or a long-term basis. Energy losses are introduced when converting energy from one energy type to another energy type. Further losses occur when storing energy, extracting energy, routing energy, etc. Minimizing the energy losses is critical to any energy storage and retrieval/recovery technique. Electrical energy storage is possible using techniques such as mature storage battery technologies, but the costs of large battery banks are prohibitive in terms of both up-front cost and maintenance costs. Further, batteries are problematic for long-term storage purposes because of charge leakage.

In disclosed techniques, energy management uses controlled liquefaction. Energy in excess to demand can be captured, converted to another energy form such as a liquefied gas, and stored for later use. The energy can be obtained locally using an onsite microgrid or from farther afield using a larger grid such as a regional or national grid. The energy can be generated using fuels such as coal, natural gas, or nuclear sources; using hydro power or geothermal energy; using renewable sources such as solar, wind, tidal, wave action, biofuels or biogas; using pump-turbine sources such as compressed air, steam, or ice; or using backup power sources such as diesel-generator sets; and so on. A gas within a first pressure containment vessel is pressurized using a column of liquid. The liquid used for the pressurizing can include a liquid such as water.

Energy storage can be based on energy storage and conversion requirements. Energy can be stored and converted using an energy management system based on controlled liquefaction, where the energy management system can include a pump or pump-turbine subsystem connected to one or more gas liquefaction systems. The liquefied gas-based energy management system can be part of a larger energy management system that includes one or more large-scale energy storage subsystems. The large-scale energy storage subsystem can store electrical energy, potential energy, thermal energy, kinetic energy, etc. A gas within a first pressure containment vessel is compressed using a column of liquid. The column of liquid can be a component of a liquid piston system comprising the column of liquid and a pump or pump turbine. The pump can be driven by electrical energy. The gas which is being pressurized is cooled using a liquid spray. The liquid spray is introduced into the first pressure containment vessel in a region occupied by the gas. The liquid spray can be used to keep the pressurizing to be isothermal. Isothermal pressurizing maintains a constant or near-constant temperature of the gas being pressurized. The liquid spray can be a similar substance to the gas which is being pressurized or can be a dissimilar substance. The dissimilar substances of the gas and the cooling spray can later be separated or isolated. The gas that was pressurized is metered into a second pressure containment vessel, where the metering enables liquefaction of the gas. The gas that was liquefied is pushed into a holding tank, where the holding tank can include a cryogenic tank or similar structure. The pushing is accomplished by the pressure of the gas that was metered into the second pressure containment vessel.

FIG. 1 is a flow diagram for controlled liquefaction and energy management. Energy storage, recovery, and management can be based on controlled liquefaction. A controlled liquefaction energy management subsystem can store various forms of energy such as electrical energy by storing the energy as one or more liquid columns in holding tanks. The fluid columns can include cryogenic liquid columns, and the holding tanks can include cryogenic tanks. The energy can be stored based on a liquid phase of a gas which is being pressurized. The energy can be stored using gaseous energy transfer, where the gas can include a vacuum, air, or a gas such as $NH_3$, $CH_4$, Liquefied Natural Gas, air, or Freon™. The controlled liquefaction energy management subsystem can be part of a large energy storage subsystem, where the energy storage subsystems can include multiple batteries or capacitors, pressurized storage elements such as high-pressure water, pressurized air, steam, ice-water slurry, and the like. A gas is pressurized within a pressure containment vessel using a column of liquid. The gas which is being pressurized is cooled using a liquid spray. The pressurized gas is metered into a second pressure containment vessel, where the metering includes liquefaction of the gas. The gas that was pressurized is pushed into a second pressure containment vessel, where the pushing is accomplished by the pressure of the gas that was metered into the second pressure containment vessel.

A flow 100 is shown for controlled liquefaction and energy management. Controlled liquefaction can be accomplished by liquefying a gas which is being pressurized into a cryogenic liquid column. Energy, such as electrical energy from a traditional electrical grid, energy from renewable sources, and so on, can be stored. Thermal energy, mechanical energy, pressure, and other forms of energy can also be stored. The energy can be transformed into an energy format which can be stored for a length of time. Energy management can be used for storing, retrieving, or extracting energy from an energy storage subsystem. The energy storage subsystem can be a large-scale energy storage subsystem or can be a small-scale energy storage subsystem. The energy storage subsystems can be based on battery storage, capacitor storage, inductive storage, compressed air storage, steam or ice storage, ice-water slurry, and so on. Described herein, the energy storage subsystem can include a controlled liquefaction subsystem. A controlled liquefaction storage subsystem can include energy storage elements such as high-pressure chambers, compression-expansion chambers, compressed air chambers, and so on. The energy storage subsystems can include cryogenic liquid columns. A controlled liquefaction energy management system can be implemented within a cryogenic tank. The storage elements of an energy storage subsystem can store various energy types including electrical energy, thermal energy, kinetic energy, mechanical energy, hydraulic energy, and so on.

The flow 100 includes decontaminating a gas 105 which is being pressurized prior to the pressurizing. Discussed throughout, the gas which can be pressurized can include gases such as $NH_3$, $CH_4$, Liquefied Natural Gas, air, or Freon™. The gases can contain contaminants which can be removed prior to pressurizing the gases. Depending on the gas, the contaminants can include dust, pollen, hair, insects, and so on. The gases can be decontaminated prior to pressurizing to improve efficiency of the pressurizing; to prevent blockages within pressure tanks, valves, or pipes; for safety; and so on. The decontaminating can be based on mechanical filters, electrostatic filters, deionization, dehydration, etc. The flow 100 includes pressurizing a gas within a first pressure containment vessel 110. The pressurizing the gas within the first pressure containment vessel can be accomplished using a pump, a pump turbine, pressure amplification pipes, and so on. In the flow 100, the pressurizing uses a column of liquid 112. The column of liquid can be provided by a water piston heat engine (WPHE). The WPHE comprises a high-pressure vessel and a pump. The liquid can occupy one portion of the high-pressure vessel and the gas can occupy another portion of the high-pressure vessel. The pump can impel liquid into the vessel thus pressurizing the gas. In embodiments, the pressurizing a gas can be accomplished using a plurality of stages 114. The plurality of stages can include a plurality of high-pressure vessels and pumps. In embodiments, the gas which is being pressurized can be stored in a gas capacitor 116 prior to metering the gas into a second pressure containment vessel (discussed below). The gas capacitor can store or provide pressurized gas, can reduce variations in gas pressure, and so on. In further embodiments, the gas, which is being pressurized can include $NH_3$, $CH_4$, Liquefied Natural Gas, air, or Freon™. Other elemental or manufactured gases can also be used. The flow 100 further includes a plurality of directional flow control valves 118 that enable unidirectional fluid flow for the liquefaction control. The directional control values can be used to transfer liquids, gases, and so on, between or among pressure containment vessels, holding tanks, dehydrators, and so on.

The flow 100 includes cooling the gas 120 which is being pressurized. The liquid spray is introduced into the first pressure containment vessel in a region occupied by the gas. According the Ideal Gas Law, PV=nRT, compressing a gas can generate significant amounts of heat. This generated heat can damage the liquid piston system or other components used for controlled liquefaction and energy management. The generated heat could ignite certain gases that are being pressurized. In the flow 100, the cooling uses a liquid spray 122. The liquid spray can be used to remove excess generated heat from the pressure containment vessel. The droplets within the spray can absorb the generated heat. In embodiments, the liquid spray can keep the pressurizing to be isothermal. Isothermal pressurizing can maintain a constant or near-constant temperature within the pressure containment vessel. Various liquids can be used for the liquid spray. In embodiments, the liquid spray can be the same substance as the column of liquid. The liquid spray can comprise other substances. In other embodiments, the liquid spray can be a dissimilar substance from the gas which is being pressurized. The flow 100 further includes dehydrating the gas 124 which is being pressurized after the cooling. The cooling of the gas which is being pressurized can cause water vapor to precipitate out of the gas. The dehydrating the gas can be accomplished by removing the water vapor or other vapors from the pressurized gas once the cooling is complete.

The flow 100 includes removing the dissimilar substance 126 after the cooling. The dissimilar substance used for cooling the pressurized gas can be removed from the pressurized gas. The dissimilar substance can be removed for later reuse for cooling or other energy management applications, can be discarded, and so on. The removing the dissimilar substance can return the pressurized gas to, or nearly to, the previous purity level of the pressurized gas. The flow 100 further includes additionally cooling the gas after it leaves the first pressure containment vessel using one or more heat exchangers 128. Discussed below, the one or more heat exchangers can transfer heat from the gas, after it leaves the pressure containment vessel, to a liquid. In embodiments, the one or more heat exchangers can be cooled by a liquefied version of the gas. The cooling of the gas is accomplished by transferring the heat from the gas to the liquefied version of the gas. The liquefied version of the gas can undergo a phase change from the liquefied version of the gas to a gas. In embodiments, a dehydrator for the gas (discussed above) can be included between at least two of the one or more heat exchangers. The dehydrator can remove vapor such as water vapor from the gas that is being cooled.

The flow 100 includes metering the gas that was pressurized into a second pressure containment vessel 130. The metering can be accomplished using a valve such as a valve controlled by a solenoid, a smart valve, and so on. In embodiments, a plurality of directional flow control valves can enable unidirectional fluid flow for the liquefaction control. The directional valves can include check valves, multiway valves such as three-way or four-way valves, a shuttle valve, and so on. In the flow 100, the metering enables liquefaction 132 of the gas. The liquefaction can include the liquefaction of gas 2 or another gas.

The composition of liquid 1 and gas 2 can be chosen to provide the desired function based on the thermodynamics (latent heat and boiling point) of gas 2 and the thermodynamics (cooling) and miscibility/extractability properties of liquid 1. In cases where the preferred combination of liquid 1 and gas 2 is not sharp interface immiscible, explosive, difficult to purify out of gas 2, and so on, an intermediate gas/liquid interface can be provided to buffer, as it were, liquid 1 and gas 2, while retaining the thermodynamic advantages of that combination in the overall system. In that case, a secondary pair of pressure containment vessels is inserted between the primary pair, such that liquid 1 now compresses gas 3, which in turn enables liquid 4 to compress gas 2.

The flow 100 includes pushing the gas that was liquefied in the second pressure containment vessel into a holding tank 140. The holding tank can include one or more vessels such as one or more pressure containment vessels. In embodiments, the holding tank can include a cryogenic tank. In the flow 100, the holding tank stores a liquefied state of the gas 142. The liquefied state of the gas can be based on a specific pressure and temperature. The pushing can be accomplished using a variety of techniques. In embodiments, pushing is accomplished by the pressure of the gas that was metered into the second pressure containment vessel. The flow 100 further includes controlling the pressurizing, the cooling, the metering, and the pushing using a computing device 150. The computing device can include a component within the energy management system. The computing device can include a central processing unit (CPU), a microcontroller, a processor, and so on. The computing device can include a processing core within a programmable device such as a field programmable gate array (FPGA). The computing device can include a processing core within an application specific integrated circuit (ASIC).

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
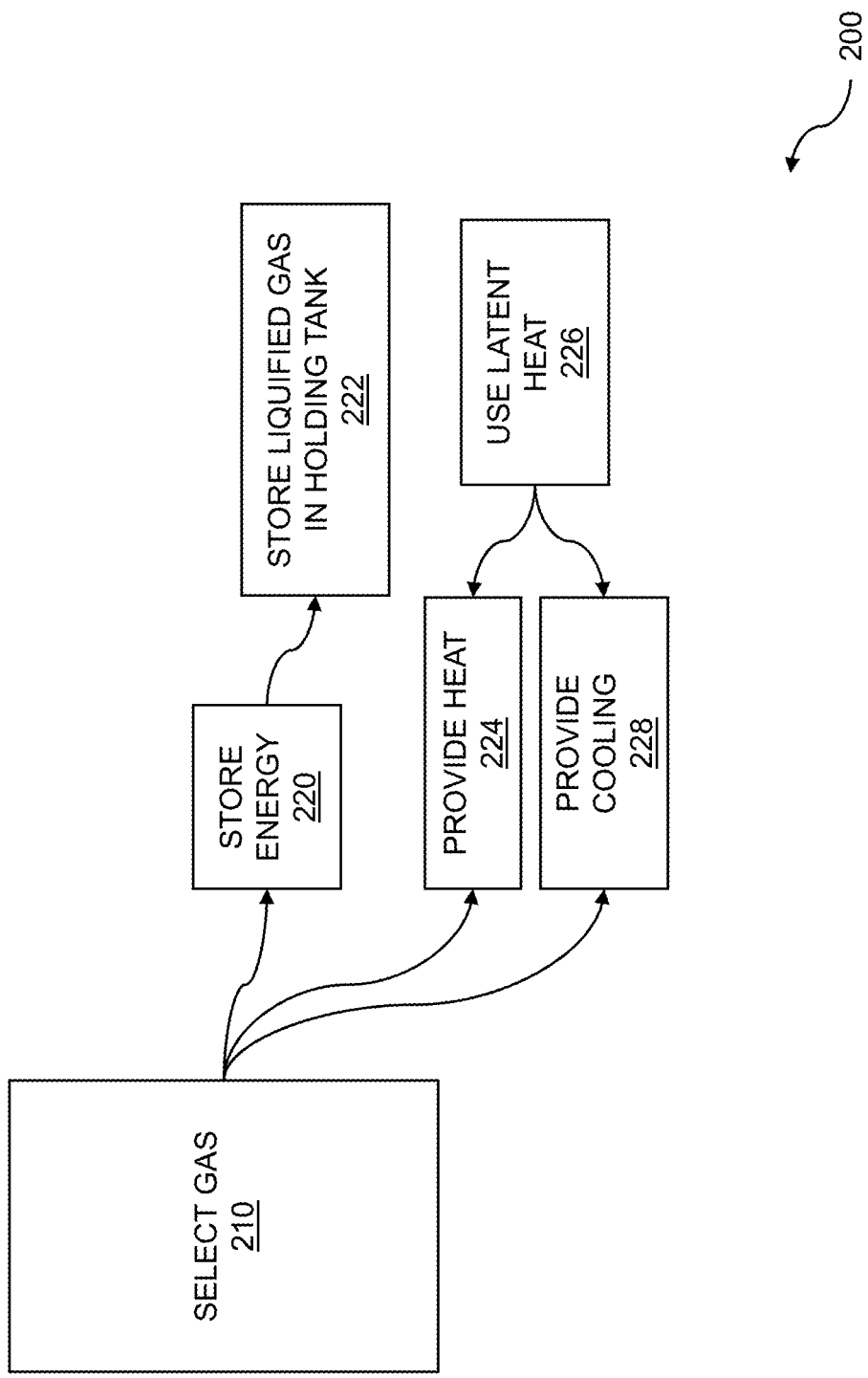
FIG. 2 is flow diagram for gas selection.

FIG. 2 is flow diagram for gas selection. Discussed throughout, a gas can be selected for use with controlled liquefaction and energy management techniques. The choice of the gas can be critical to the types of techniques and applications that can be enabled such as energy storage, conversion, and generation; heating and cooling applications; providing hot water or steam; and so on. Gas selection supports controlled liquefaction and energy management. A gas within a first pressure containment vessel is pressurized using a column of liquid. The gas that is being pressurized is cooled using a liquid spray. The liquid spray is introduced into the first pressure containment vessel in a region occupied by the gas. The gas that was pressurized is metered into a second pressure containment vessel, where the metering enables liquefaction of the gas. The gas that was liquefied in the second pressure containment vessel is pushed into a holding tank, where the holding tank stores a liquefied state of the gas, and where the pushing is accomplished by the pressure of the gas that was metered into the second pressure containment vessel. The holding tank can include a cryogenic tank.

The flow 200 includes selecting a gas 210 for use with controlled liquefaction. The gas can be selected based on a variety of criteria such as cost, availability, and so on. The gas can be chosen based on solubility, where a gas with low solubility into a liquid with which the gas can be in contact can be desirable. The selected gas can include a substance similar to or dissimilar from the liquid with which it comes into contact. In embodiments, the gas can include air, $NH_3$, $CH_4$, Liquefied Natural Gas, $CO_2$, air, Freon™, and so on. In the flow 200, the gas is selected to provide an energy storage 220 function. The energy that is stored using the selected gas can include grid energy, renewable energy, microgrid (e.g., locally generated) energy, and so on. The energy that is stored can include intermittently generated energy, such as energy from solar, wind, tidal, or wave action sources. The energy that is stored can include energy that exceeds energy needs at given time. The flow 200 includes storing the gas 222 that was liquefied in the holding tank. The holding tank can include a pressure containment vessel such as a high-pressure containment vessel. In embodiments, the holding tank includes a cryogenic tank. The energy that is stored in the holding tank can include thermal energy, mechanical energy as fluid head, etc.

In the flow 200, the gas is selected to provide a heating function 224. The heating function can be realized by choosing a gas that boils or vaporizes at a given temperature and pressure. In embodiments, the heating function can be accomplished using a boiling point above a desired heating function temperature. In the flow 200, the heating function is accomplished using latent heat 226. Recall that latent heat describes energy that is absorbed or released by a thermodynamic system or a body. The energy is absorbed or released while maintaining a substantially constant temperature. The latent heat includes an amount of energy associated with a phase change of a substance, such as a phase change from a solid to a liquid or a phase change from a liquid to a gas or vapor. In another technique, the gas that is selected can be compressed. By increasing pressure on the selected gas, the temperature of the gas can increase (Ideal Gas Law: $PV=nRT$). The heat that can be generated by compression can be transferred to a volume, such as the volume of a room, to provide heat to the room. The heat that is generated can further be used to heat water, to convert water to steam, and so on. In the flow 200, the gas is selected to provide a cooling function 228. The cooling function can be accomplished by enabling the liquefied gas to boil or evaporate by decreasing pressure on the liquefied gas. As for heating, the cooling can be enabled using latent heat. The providing heat 244 can comprise a heat pump function. The fluid involved in a room heating function can be water (boiling point of 100° C. >>room temperature of ~20° C.) or another suitable high boiling point organic liquid. An antifreeze can be added to the water to prevent ice formation during the process.

Figure 3:
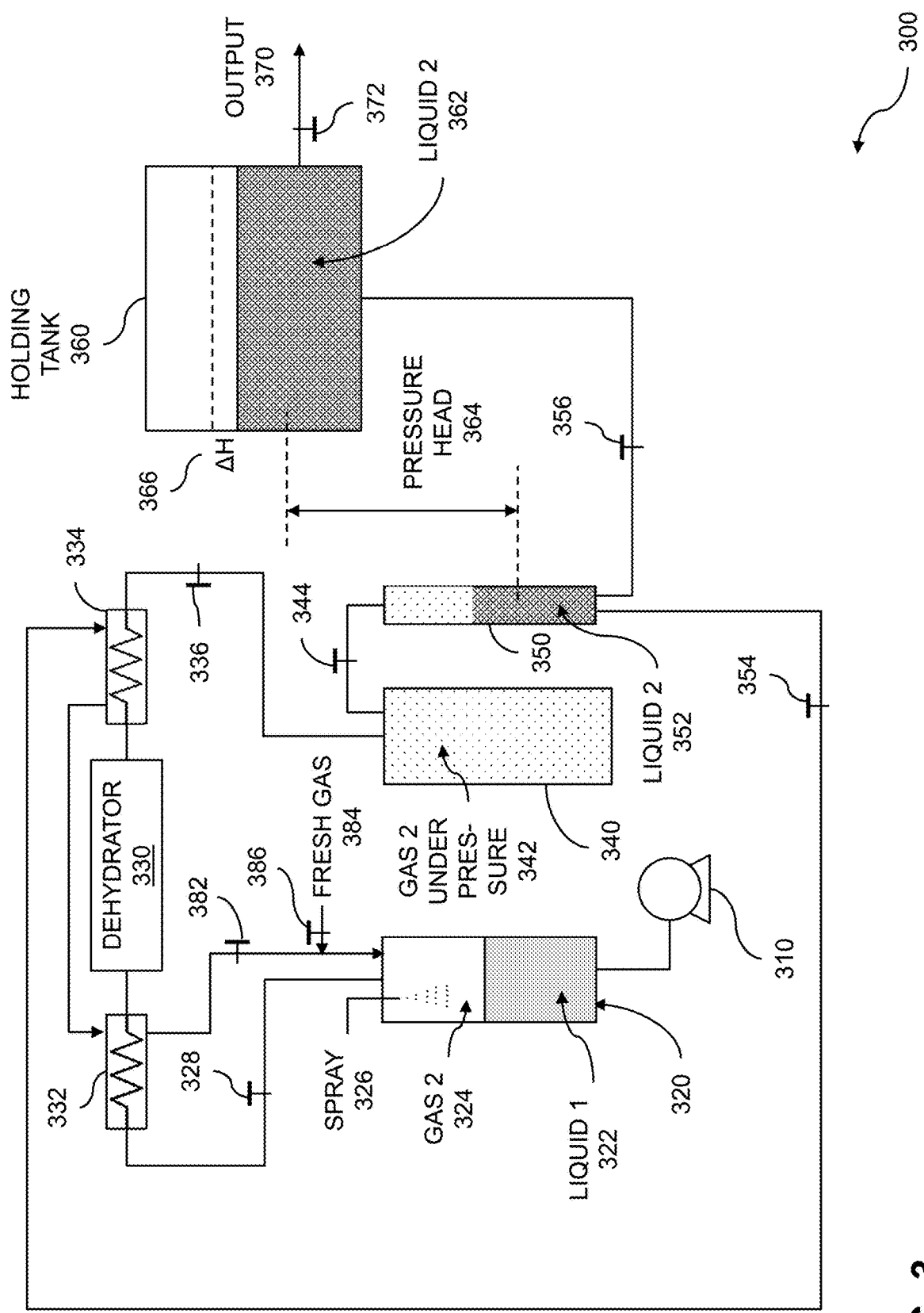
FIG. 3 is a block diagram for controlled liquefaction and energy management.

FIG. 3 is a block diagram for gas liquefaction. Gas liquefaction includes controlling the state conversion or condensing of a gas from a vapor state to a liquid state. The liquefaction of the gas can be accomplished by changing the temperature of the gas, the pressure of the gas, or both. Gas liquefaction can be controlled using one or more energy management techniques for storing energy, recovering energy, converting energy from an energy type to a different energy type, and so on. The storing and recovering energy can include storing excess energy for later use, capturing energy from renewable energy sources to equalize energy availability, and the like. A gas within a first pressure containment vessel is pressurized using a column of liquid. The gas that is being pressurized is cooled using a liquid spray. The liquid spray is introduced into the first pressure containment vessel in a region occupied by the gas. The gas that was pressurized is metered into a second pressure containment vessel, wherein the metering enables liquefaction of the gas. The gas that was liquefied in the second pressure containment vessel is pushed into a holding tank, wherein the holding tank stores a liquefied state of the gas, and wherein the pushing is accomplished by the pressure of the gas that was metered into the second pressure containment vessel.

A block diagram for gas liquefaction 300 is shown. The block diagram 300 includes a pump 310. The pump can include a stand-alone pump, a pump turbine, and so on. The pump can include an electrically operated pump, a pump operated by spinning a turbine using a gas or a liquid, and the like. The pump can be used to move a liquid such as a liquid 1. The block diagram 300 includes a pressure containment vessel 320. The pump can pressurize a column of liquid within the pressure containment vessel. In embodiments, the column of liquid can be provided by a water piston heat engine (WPHE), where the pressure containment vessel and the pump can comprise the WPHE. The pressure containment vessel can contain the liquid such as liquid 1 322 being pumped by the pump. The pressure containment vessel can further contain a gas such as gas 2 324 which can be compressed by the pumped liquid. The liquid at a pressure P can compress the gas to the pressure P. The compression of a gas in a closed system can increase the temperature of the gas. In the block diagram 300, the cooling can be accomplished by injecting a liquid spray 326 into the pressure containment vessel. The liquid spray can be used to cool the gas that is being pressurized. The liquid spray can absorb heat from the compressed gas. If the heat absorbed from the compressed gas equals the latent heat of vaporization of the liquid, the liquid can undergo a phase change into a gas. The liquid spray can include a dissimilar substance from the gas which is being pressurized and can keep the pressurizing of the gas to be isothermal. In embodiments, the cooling of gas 2 can be accomplished using $NH_3$, $CH_4$, Liquefied Natural Gas, $CO_2$, air, or Freon™. The excess heat that is generated by the compressing is transferred to the liquid droplets.

The block diagram 300 includes a dehydrator 330. Gas 2 can be routed to the dehydrator using a valve such as valve 328. The dehydrator can be used to dehydrate the gas which is being pressurized after the cooling spray has been injected into the pressure containment vessel. Cooling the gas can cause vapor such as water vapor to form and to condense out of the gas. The vapor including water vapor can be removed or separated from the gas by cooling the gas. In embodiments, the removing the water vapor can be accomplished by removing condensate from the dehydrator. Removing vapor such as water vapor is performed to reduce or eliminate "freezing up" of system components such as pipes, valves, pressure containment vessels, and so on. The freezing up can include formation of ice. Other techniques can be performed on the gas. The block diagram 300 can include a removal or separator block (block not shown). The removal block can remove the dissimilar substance from the gas. The dissimilar substance can be removed for later reuse, applied to a different task, discarded, etc. The dissimilar substance can be removed from the gas after the cooling. In embodiments, the dehydrator for the gas is included between at least two of the one or more heat exchangers. The block diagram 300 further includes additionally cooling the gas after it leaves the first pressure containment vessel using one or more heat exchangers. Gas 2 can be routed through the one or more heat exchangers such as heat exchangers 332 and 334. The one or more heat exchangers provide further cooling to gas 2. The heat given up by gas 2 is transferred to a second liquid, liquid 2, discussed below.

The block diagram 300 includes a gas capacitor 340. The gas capacitor can comprise a second pressure containment vessel, where the gas capacitor can be used to store gas, provide gas, receive gas, and so on. The gas capacitor can be used to store the gas such as gas 2 under pressure P 342. Gas 2 is transferred to the gas capacitor through valve 336. Gas 2 within the gas capacitor 340 can be transferred to a pressure containment vessel 350 through a valve 344, where the pressure containment vessel can contain a second liquid, liquid 2 352. Liquid 2 can be similar to liquid 1 or can be dissimilar from liquid 1. In embodiments, a heat exchanger downstream of the dehydrator receives the liquefied version of the gas that was metered from the second pressure containment vessel 350 before a heat exchanger that is upstream of the dehydrator. The heat exchanger upstream of the pressure containment vessel can include heat exchanger 332. One or more heat exchangers can be included for the further cooling. Liquid 2 can comprise liquefied gas 2. Liquid 2 can be routed to the heat exchangers 334 and 332 through valve 354. Liquid 2 can be used to cool gas 2, including gas 2 before and after dehydration, by absorbing heat resulting from the compression of gas 2 (described above). In embodiments, the one or more heat exchangers, during the process of cooling the gas, can heat the liquefied version of the gas such that it returns to a gaseous state. Completing the cycle, liquid 2, now in gaseous form, can be returned to pressure containment vessel 320 through valve 382. Fresh gas 384 can be provided through valve 386. The fresh gas can be provided to replace gas absorbed into liquid 1, gas that escaped from the system, gas vented, liquid drawn at an output for energy recovery, and so on. In embodiments, the liquefied version of the gas that was returned to a gaseous state can be metered back into the first pressure containment vessel 320.

The block diagram 300 includes a holding tank 360. In embodiments, the holding tank can be a cryogenic tank. The holding tank such as a cryogenic tank can be used to store one or more cryogenic liquid columns. A cryogenic liquid column can include a liquefied gas, where the liquefied gas can include a liquid such as liquid 2 362. Liquid 2 can be substantially similar to or substantially dissimilar from the liquid 1 discussed above. The cryogenic tank can be positioned at an elevation, where the elevation can include an elevation H. The elevation H can be chosen such that a pressure containment vessel can be filled gravitationally. The block diagram 300 includes a valve 356. The valve can be control or meter the flow of the liquid such as liquid 2 from the cryogenic tank to a pressure containment vessel. The metering can be used to control a rise or a fall of a pressure head 364, where the pressure head is proportional to the height H of a cryogenic liquid column. The amount of rise or fall of the pressure head can be defined by a change in height $\Delta H$ 366. Energy is required to attain a change in fluid height $\Delta H$. The energy can be obtained by gas 2 as the gas expands and liquefies. In the block diagram 300, liquid 2 362 can be directed to an output 370 through a valve 372. The liquid that is drawn from the holding tank 360 can be used to spin a turbine, to provide cooling, to convert to a different energy type, and so on.

Figure 4:
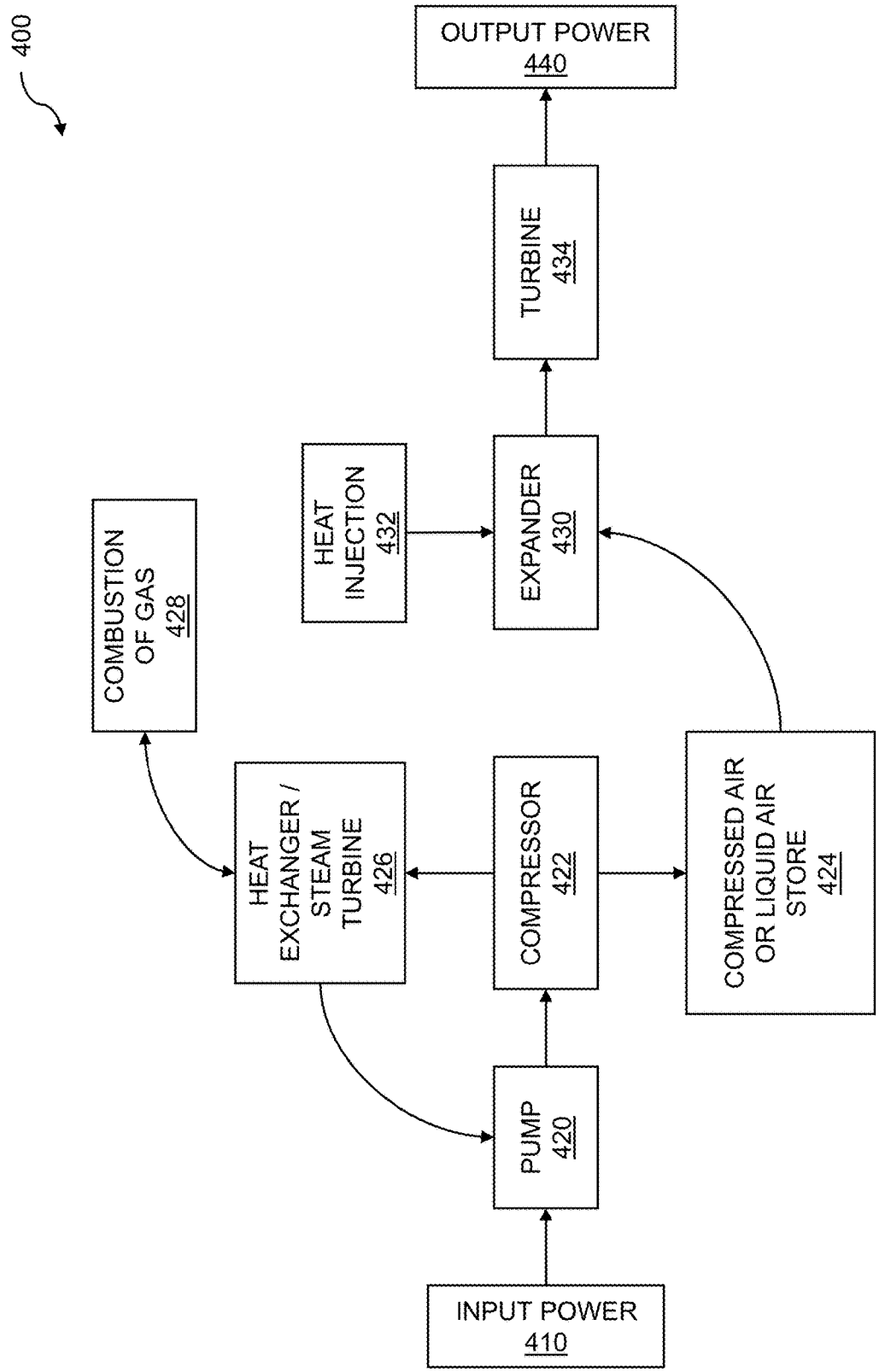
FIG. 4 illustrates energy storage and recovery.

FIG. 4 illustrates energy storage and recovery 400. Energy storage and recovery can be can based on energy management. Energy management can include controlling energy storage, generation, connection, provision, delivery, and so on, where the control can be software based. Energy management can include storing energy for a period of time, where the period of time can include a short-term basis, a long-term basis, etc. The stored energy can be recovered and delivered to meet one or more energy load requirements. The energy recovery and delivery can be based on energy load requirements, seasonal adjustments, energy generation and usage policies, service level agreements, and the like. The energy storage and recovery can be accomplished using an energy internet. Energy storage and recovery can enable controlled liquefaction and energy management. A gas within a first pressure containment vessel is pressurized using a column of liquid. The gas that is being pressurized is cooled using a liquid spray, wherein the liquid spray is introduced into the first pressure containment vessel in a region occupied by the gas. The gas that was pressurized is metered into a second pressure containment vessel, wherein the metering enables liquefaction of the gas. The gas that was liquefied in the second pressure containment vessel is pushed into a holding tank, wherein the holding tank stores a liquefied state of the gas, and wherein the pushing is accomplished by the pressure of the gas that was metered into the second pressure containment vessel. In embodiments, the column of liquid is provided by a water piston heat engine.

Input power 410 can include energy sources such as grid energy from sources that are derived from coal or natural gas, hydro, and nuclear sources; and renewable energy that is derived from sources such as biogas, solar, wind, geothermal, tidal, and wave action. Energy produced from some renewable energy sources can be intermittent. Solar or wind generation relies on the presence of sunlight or wind, respectively. Energy output from solar generation is at a minimum on a cloudy day, and substantially zero at night, while wind generation is substantially zero when the wind is calm. Since energy load requirements persist even in the absence of sunlight or wind, for example, energy storage is required for energy that is generated intermittently. Energy from intermittent sources can be stored. Energy storage can be based on electrical storage, chemical storage, pressure storage, and so on. In embodiments, energy can be stored by using a pump 420. The pump can include an electrically operated pump, a pump driven by a turbine, and the like. The pump can drive a compressor 422 which can be used to store energy in various forms. In embodiments, the compressor can be used to store energy as compressed air or liquid air. The compressed air or the liquid air can be collected in a store 424. The compressor can also be used to generate steam. In embodiments, the compressor can drive a heat exchanger/steam turbine 426. The steam can be used to spin the turbine, which can be used to operate the pump 420. Energy, such as excess heat, including latent heat, can be collected using the heat exchanger. In embodiments, the collected energy can be used to preheat compressed air that can then be used to spin a turbine. As for other components related to energy storage and recovery, the heat exchanger/steam turbine can be controlled. The control can be accomplished using software-based management. In embodiments, the controlling can provide heat during expansion through combustion of a gas 428.

The compressed air or liquid air can be coupled to an expander 430. The expander can be coupled to a turbine 434, where the turbine can be spun by the release of the compressed air or liquid air. As compressed air expands or is released, the compressed air cools. The result of the cooling of the air can be to precipitate out any moisture that may be contained within the compressed air. The precipitating moisture can cause the turbine to freeze or ice up due to an accumulation of frost within the turbine. To prevent icing up of the turbine, heat collected by the heat exchanger can be injected 432 into the expander 430. The turbine can be coupled to or can include a generator (not shown). The generator can produce output power 440. The output power can be used to meet increased power load requirements. The output power can be generated from the stored energy, where the stored energy can be generated by the intermittent power sources. The output power can be generated from the stored energy after a period of time that is assigned on a short-term basis or a period of time that is assigned on a long-term basis. The expander 430 can simply provide the delivery of a fluidic column, such as a column of water or liquid air, to act as a liquid piston compressor, in a pressure containment vessel coupled to store 424. The system 400 can comprise a water piston heat engine.

By way of example, an energy transfer cycle can be illustrated using an adiabatic process, which occurs when neither heat nor mass of a material is transferred between a given thermodynamic system and the environment that surrounds the thermodynamic system. "Adiabaticity" can describe a quality of the adiabatic process. For the techniques described herein, an adiabatic process with adiabicity equal to zero percent is described as perfectly isothermal, while an adiabatic process with adiabicity equal to 100 percent is described as perfectly adiabatic.

A pressure—volume (PV) diagram can be used to show changes in pressure versus volume for one or more thermodynamic processes. A cycle, such as an energy transfer cycle, can be based on the one or more thermodynamic processes. One lap around the cycle can complete the cycle, where the completed cycle can result in a net no change of system state. At the end or completion of the cycle, the thermodynamic system state returns to a pressure and a volume which is equal to the pressure and the volume of the system at the beginning of the cycle. States at each "corner" of a PV diagram can represent a pressure and a corresponding volume within the energy transfer cycle. While four states are typically used, other numbers of states may be present for a given cycle. A path between two states can represent a process. Thus a typical PV diagram can show four states connected by four processes, although, other numbers of processes and states may be present within a given cycle.

A given process can affect a system pressure, a system volume, or both a system pressure and a system volume. For an energy transfer cycle contemplated in this illustration, the processes can include isothermal expansion, a reversible adiabatic or isentropic expansion, a reversible isothermal compression, and a reversible adiabatic or isentropic compression. Using the first law of thermodynamics, for a closed system, any heat removed from the system, such as an output heat, can be determined to be equal to the quantity of input heat minus work.

A cycle of a thermodynamic system can include one or more thermodynamic processes. The thermodynamic processes can include isothermal processes and adiabatic processes. When the adiabicity of adiabatic processes is nearly equal to zero, then the thermal dynamic system can be described approximately as an isothermal system. An isothermal energy transfer thermodynamic system can support controlled liquefaction and energy management. A gas within a first pressure containment vessel is pressurized using a column of liquid. The gas that is being pressurized is cooled using a liquid spray, where the liquid spray is introduced into the first pressure containment vessel in a region occupied by the gas. The gas that was pressurized is metered into a second pressure containment vessel, where the metering enables liquefaction of the gas. The gas that was liquefied in the second pressure containment vessel is pushed into a holding tank, where the holding tank stores a liquefied state of the gas, and where the pushing is accomplished by the pressure of the gas that was metered into the second pressure containment vessel. The pressurizing, the cooling, the metering, and the pushing are controlled using a computing device.

Figure 5:
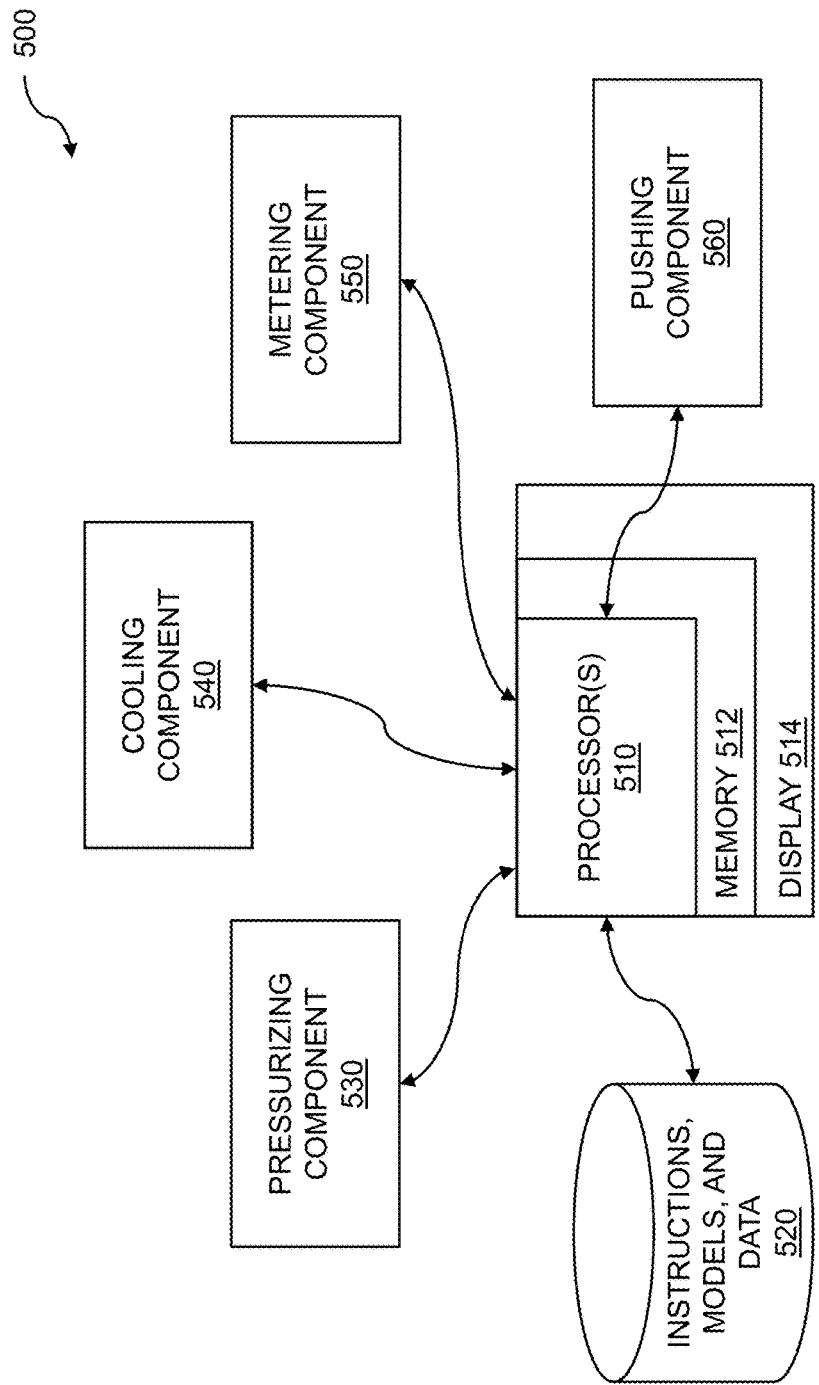
FIG. 5 is a system diagram for controlled liquefaction and energy management.

FIG. 5 is a system diagram for liquefaction control. Enabling of a liquefaction control system is based on liquefaction control and energy management. A gas within a first pressure containment vessel is pressurized using a column of liquid. The gas that is being pressurized is cooled using a liquid spray, where the liquid spray is introduced into the first pressure containment vessel in a region occupied by the gas. The liquid spray keeps the pressurizing to be isothermal. The gas which is being pressurized is dehydrated after the cooling. The gas that was pressurized is metered into a second pressure containment vessel, where the metering enables liquefaction of the gas. The gas that was liquefied in the second pressure containment vessel is pushed into a holding tank, where the holding tank stores a liquefied state of the gas, and wherein the pushing is accomplished by the pressure of the gas that was metered into the second pressure containment vessel. The pressurizing, the cooling, the metering, and the pushing are controlled using a computing device. The gas that is used is selected to provide a variety of functions including storing energy, providing heat, and providing cooling.

The system 500 can include one or more processors 510 and a memory 512 which stores instructions. The memory 512 is coupled to the one or more processors 510, wherein the one or more processors 510 can execute instructions stored in the memory 512. The memory 512 can be used for storing instructions, for storing databases for liquefaction systems, for storing switching valve and non-return valve configurations, and the like. Information regarding the control of a liquefaction and energy management system can be shown on a display 514 connected to the one or more processors 510. The display can comprise a television monitor, a projector, a computer monitor (including a laptop screen, a tablet screen, a netbook screen, and the like), a smartphone display, a mobile device, or another electronic display. The system 500 includes instructions, models, and data 520. The data can include information on liquefaction systems; information on the controlling of switching valves, non-return valves, or smart valves; metadata about liquefaction; and the like. In embodiments, the instructions, models, and data 520 are stored in a networked database, where the networked database can be a local database, a remote database, a distributed database, and so on. The instructions, models, and data 520 can include instructions for obtaining access to a pressure containment vessel, where the pressure containment vessel can be a component within a water piston heat engine. The instructions, models, and data can further include instructions for pressurizing a gas within a pressure containment vessel, for cooling the gas with a liquid spray, for using a pressure capacitor, and for filling a tank such as a cryogenic tank. The instructions, models, and data can further include instructions for controlling switching valves which enable the pressurized gas to be liquefied into a cryogenic column, to be pushed into a cryogenic column in a second vessel, and so on. The instructions, models, and data can further include operating data obtained from a plurality of controlled liquefaction and energy management systems, a plurality of fluid-based local energy transfer distribution networks, one or more operating goals for the plurality of controlled liquefaction and energy management systems, instructions for analyzing operating data, instructions for controlling the operation of energy storage and generation assemblies, etc. In embodiments, at least one of the one or more fluid-based energy storage and generation assemblies includes a pump running at an optimum performance pressure point. An optimum performance pressure point can be determined based on the design of the energy storage and generation assembly, on the past operation of the assembly, etc.

The system 500 includes a pressurizing component 530. The pressurizing component 530 can pressurize a gas within a pressure containment vessel using a column of liquid. The liquid can be part of a liquid piston system, where the liquid piston can apply pressure using a pump, a pump turbine, and so on. The pressure containment vessel can include a high-pressure vessel. Prior to the pressurizing, the gas which is being pressurized can be decontaminated. The decontaminating can include removing foreign substances such as other gases from the gas, dehumidifying the gas, etc. In embodiments, the pressurizing a gas can accomplished using a plurality of stages. The system 500 includes a cooling component 540. The cooling component 540 can use a liquid spray to cool the gas which is being pressurized. The liquid spray is introduced into the first pressure containment vessel in a region occupied by the gas. The cooling with the liquid spray can be accomplished using a variety of liquids. The spray can include a substance similar to the gas which is pressurized. In embodiments, the liquid spray keeps the pressurizing to be isothermal. For the pressurizing to be isothermal, the temperature of the gas which is being pressurized must remain constant. In other embodiments, the liquid spray is a dissimilar substance from the gas which is being pressurized. The use of dissimilar substances can enable separation of the of the liquid spray substance from the pressurized liquid. In embodiments, the cooling function can be accomplished using $NH_3$, $CH_4$, Liquefied Natural Gas, $CO_2$, air, or Freon™. Other liquids such as water can also be used.

The system 500 includes a metering component 550. The metering component 550 can meter the gas that was pressurized into a second pressure containment vessel, wherein the metering enables liquefaction of the gas. The metering the gas can include enabling a volume of gas, a rate of gas release, and so on. The gas that was liquefied can be stored in a variety of pressure containment vessels such as a high-pressure vessel. The liquefied gas can be used for storing energy, providing cooling, and so on. The cooling can include cooling gases such as the gas that was pressurized into the first pressure containment vessel. Further embodiments can include additionally cooling the gas after it leaves the first pressure containment vessel, using one or more heat exchangers. The heat exchangers can be cooled by a liquid, a gas, and so on. In embodiments, the one or more heat exchangers can be cooled by a liquefied version of the gas. The liquefied version of the gas can be metered from one or more sources. In embodiments, the liquefied version of the gas can be metered from the second pressure containment vessel. The second vessel can include a gas capacitor. Further embodiments can include storing the gas that was pressurized in the gas capacitor prior to the metering. The gas capacitor can be used to help maintain a substantially constant pressure during the metering. The system 500 includes a pushing component 560. The pushing component can push the gas that was liquefied in the second pressure containment vessel into a holding tank, where the holding tank stores a liquefied state of the gas, and wherein the pushing is accomplished by the pressure of the gas that was metered into the second pressure containment vessel. The holding tank can include a cryogenic tank, a high-pressure vessel, and so on. The pushing can include pushing a cryogenic liquid column, where the height of the column is determined as the difference in height between the centroid of the gas capacitor and the centroid of the holding tank.

The system 500 can include a computer system for liquefaction control comprising: a memory which stores instructions; one or more processors coupled to the memory wherein the one or more processors, when executing the instructions which are stored, are configured to: pressurize a gas within a first pressure containment vessel using a column of liquid; cool the gas that is being pressurized using a liquid spray, wherein the liquid spray is introduced into the first pressure containment vessel in a region occupied by the gas; meter the gas that was pressurized into a second pressure containment vessel, wherein the metering enables liquefaction of the gas; and push the gas that was liquefied in the second pressure containment vessel into a holding tank, wherein the holding tank stores a liquefied state of the gas, and wherein the pushing is accomplished by the pressure of the gas that was metered into the second pressure containment vessel. Disclosed embodiments include a computer program product embodied in a non-transitory computer readable medium for liquefaction control, the computer program product comprising code which causes one or more processors to perform operations of: pressurizing a gas within a first pressure containment vessel using a column of liquid; cooling the gas that is being pressurized using a liquid spray, wherein the liquid spray is introduced into the first pressure containment vessel in a region occupied by the gas; metering the gas that was pressurized into a second pressure containment vessel, wherein the metering enables liquefaction of the gas; and pushing the gas that was liquefied in the second pressure containment vessel into a holding tank, wherein the holding tank stores a liquefied state of the gas, and wherein the pushing is accomplished by the pressure of the gas that was metered into the second pressure containment vessel.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for liquefaction control comprising:

pressurizing a gas within a first pressure containment vessel using a column of liquid;

cooling the gas that is being pressurized using a liquid spray, wherein the liquid spray is introduced into the first pressure containment vessel in a region occupied by the gas;

metering the gas that was pressurized into a second pressure containment vessel, wherein the metering enables liquefaction of the gas;

additionally cooling the gas after it leaves the first pressure containment vessel using one or more heat exchangers, wherein the one or more heat exchangers are cooled by a liquefied version of the gas, wherein the liquefied version of the gas is metered from the second pressure containment vessel, wherein a dehydrator for the gas is included between at least two of the one or more heat exchangers, and wherein a heat exchanger downstream of the dehydrator receives the liquefied version of the gas that was metered from the second pressure containment vessel before a heat exchanger that is upstream of the dehydrator; and pushing the gas that was liquefied in the second pressure containment vessel into a holding tank, wherein the holding tank stores a liquefied state of the gas, and wherein the pushing is accomplished by the pressure of the gas that was metered into the second pressure containment vessel.

2. The method of claim 1 wherein the liquid spray keeps the pressurizing to be isothermal.

3. The method of claim 1 wherein the liquid spray is the same substance as the column of liquid.

4. The method of claim 1 wherein the liquid spray is a dissimilar substance from the gas which is being pressurized.

5. The method of claim 4 further comprising dehydrating the gas which is being pressurized after the cooling.

6. The method of claim 4 further comprising removing the dissimilar substance after the cooling.

7. The method of claim 1 further comprising decontaminating the gas which is being pressurized prior to the pressurizing.

8. The method of claim 1 wherein the pressurizing a gas is accomplished using a plurality of stages.

9. The method of claim 1 further comprising storing the gas that was pressurized in a gas capacitor prior to the metering.

10. The method of claim 1 wherein the gas is selected to provide a cooling function.

11. The method of claim 10 wherein the cooling function is accomplished using $NH_3$, $CH_4$, Liquefied Natural Gas, $CO_2$, air, or Freon™.

12. The method of claim 1 wherein the holding tank is a cryogenic tank.

13. The method of claim 1 further comprising controlling the pressurizing, the cooling, the metering, and the pushing using a computing device.

14. The method of claim 1 wherein the gas is selected to provide an energy storage function.

15. The method of claim 14 wherein the energy storage function comprises storing the gas that was liquefied in the holding tank.

16. The method of claim 1 wherein the gas is selected to provide a heating function.

17. The method of claim 16 wherein the heating function is accomplished using a boiling point above a desired heating function temperature.

18. The method of claim 1 wherein the one or more heat exchangers, during the process of cooling the gas, heat the liquefied version of the gas such that it returns to a gaseous state.

19. The method of claim 18 the liquefied version of the gas that was returned to a gaseous state is metered back into the first pressure containment vessel.

20. The method of claim 1 further comprising a plurality of directional flow control valves that enable unidirectional fluid flow for the liquefaction control.

21. The method of claim 1 wherein the column of liquid is provided by a water piston heat engine.

22. A computer program product embodied in a non-transitory computer readable medium for liquefaction control, the computer program product comprising code which causes one or more processors to perform operations of:

pressurizing a gas within a first pressure containment vessel using a column of liquid;

cooling the gas that is being pressurized using a liquid spray, wherein the liquid spray is introduced into the first pressure containment vessel in a region occupied by the gas;

metering the gas that was pressurized into a second pressure containment vessel, wherein the metering enables liquefaction of the gas;

additionally cooling the gas after it leaves the first pressure containment vessel using one or more heat exchangers, wherein the one or more heat exchangers are cooled by a liquefied version of the gas, wherein the liquefied version of the gas is metered from the second pressure containment vessel, wherein a dehydrator for the gas is included between at least two of the one or more heat exchangers, and wherein a heat exchanger downstream of the dehydrator receives the liquefied version of the gas that was metered from the second pressure containment vessel before a heat exchanger that is upstream of the dehydrator; and pushing the gas that was liquefied in the second pressure containment vessel into a holding tank, wherein the holding tank stores a liquefied state of the gas, and wherein the pushing is accomplished by the pressure of the gas that was metered into the second pressure containment vessel.

23. A system for liquefaction control comprising:

a memory which stores instructions;

one or more processors coupled to the memory wherein the one or more processors, when executing the instructions which are stored, are configured to:

pressurize a gas within a first pressure containment vessel using a column of liquid;

cool the gas that is being pressurized using a liquid spray, wherein the liquid spray is introduced into the first pressure containment vessel in a region occupied by the gas;

meter the gas that was pressurized into a second pressure containment vessel, wherein the metering enables liquefaction of the gas;

additionally cool the gas after it leaves the first pressure containment vessel using one or more heat exchangers, wherein the one or more heat exchangers are cooled by a liquefied version of the gas, wherein the liquefied version of the gas is metered from the second pressure containment vessel, wherein a dehydrator for the gas is included between at least two of the one or more heat exchangers, and wherein a heat exchanger downstream of the dehydrator receives the liquefied version of the gas that was metered from the second pressure containment vessel before a heat exchanger that is upstream of the dehydrator; and push the gas that was liquefied in the second pressure containment vessel into a holding tank, wherein the holding tank stores a liquefied state of the gas, and wherein the pushing is accomplished by the pressure of the gas that was metered into the second pressure containment vessel.

* * * * *